July 16, 1935.  A. M. LOCKETT  2,008,643
GRAVEL SEPARATOR AND SCRUBBER
Filed July 30, 1932  3 Sheets-Sheet 1

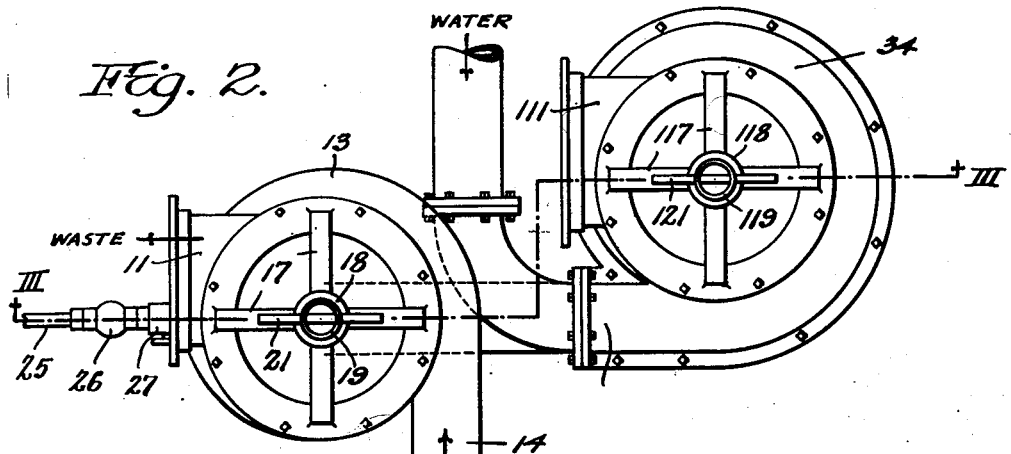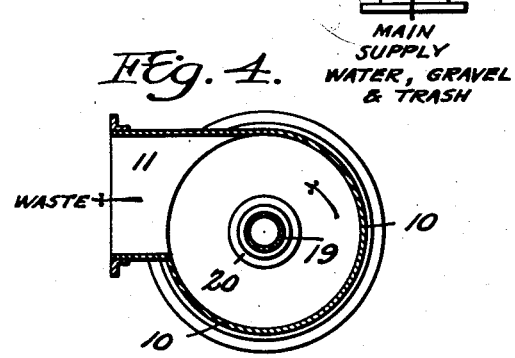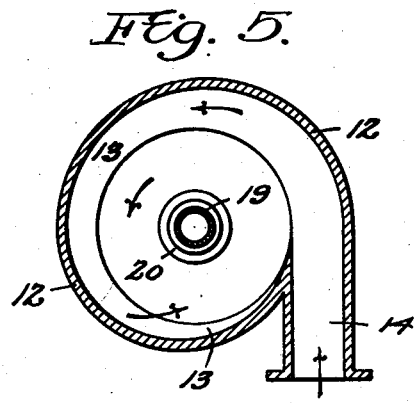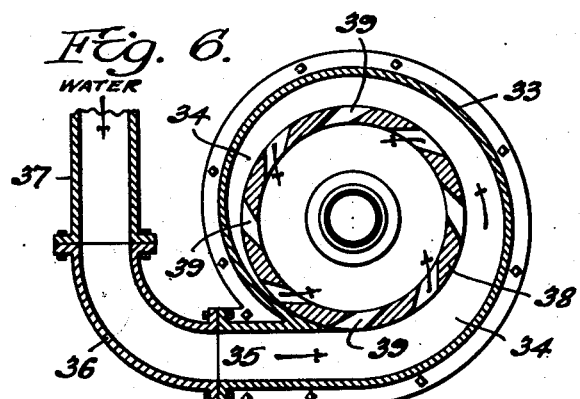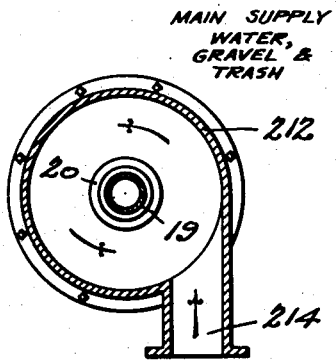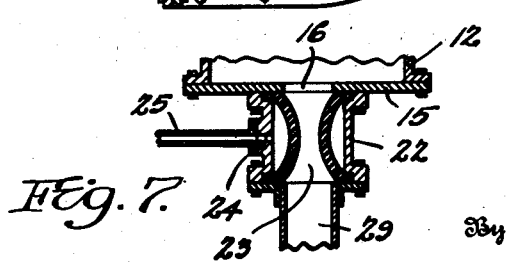

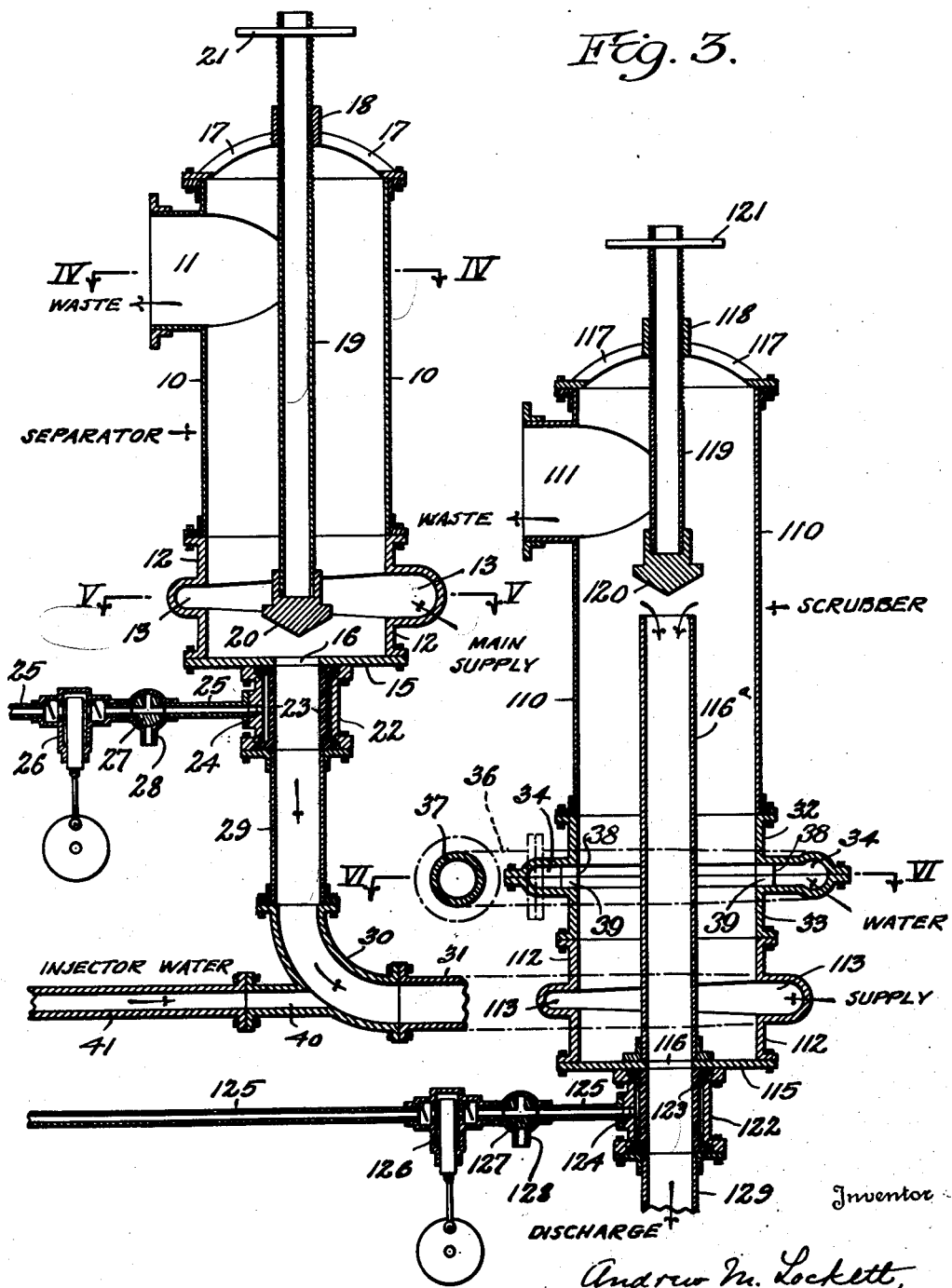

Patented July 16, 1935

2,008,643

UNITED STATES PATENT OFFICE 2,008,643

GRAVEL SEPARATOR AND SCRUBBER

Andrew M. Lockett, New Orleans, La., assignor to A. M. Lockett & Company, Limited, New Orleans, La., a corporation of Louisiana Application July 30, 1932, Serial No. 626,589

5 Claims. (Cl. 209—211)

This invention relates to apparatus for the cleaning of gravel, pebble phosphate, and similar materials.

Such materials, which, for convenience, will be hereinafter referred to simply as "gravel", are, in their natural condition, contaminated by varying quantities of trash, such as, leaves, twigs, pieces of wood, bark, sand, silt, and other foreign substances. In addition, there is usually a greater or less amount of clay associated with the gravel.

Before the gravel is commercially marketable, all trash and clay must be removed from it, and the apparatus for effecting such removal constitutes the subject matter of this invention.

There are, in nature, two commercial sources of gravel, namely, the beds of rivers and streams and dry land pits. In mining gravel from the beds of water courses, hydraulic dredges are universally used; and in mining from dry land pits, it is becoming increasingly customary to flood such pits and make a hydraulic dredging proposition of the gravel removal. In either instance, the gravel as delivered by the dredge is carried through a discharge pipe in a stream of water and usually at a rather high velocity.

This invention contemplates the provision of suitable apparatus at the point of discharge from the hydraulic dredge for the separation of foreign substances and clay from the gravel and the subsequent delivery of commercially clean gravel.

The principal object of the invention is to provide apparatus of the character described, which will be of relatively low cost to manufacture, effective in operation, and which will derive its power from the velocity of the stream of water and gravel delivered to it by the discharge pipe of the hydraulic dredge, thus reducing to a minimum the item of operating expense.

Another object of the invention is to provide such apparatus especially designed to remove all foreign substances from the gravel with the exception of clay.

A further object of the invention is to provide such apparatus especially designed to remove the clay from gravel from which all other foreign substances have previously been removed, the action of clay associated with the gravel being such as to present a special problem necessitating a corresponding special operation for its removal.

Yet another object of the invention is to provide apparatus, such as described, which shall be built up of a plurality of readily removable, replaceable, and interchangeable units.

With these and other objects in view, as will hereinafter be made manifest, the invention consists, in general, of the arrangement of parts and combination of elements, as illustrated in the accompanying three sheets of drawings, described in the following specification and specifically pointed out in the appended claims.

In the drawings, wherein like characters of reference denote like parts in the several views, Figure 1 is a front elevation of a gravel cleaning apparatus constructed in accordance with and embodying the principles of this invention;

Figure 2 is a top plan view of the same;

Figure 3 is an offset vertical sectional view on the line III—III of Figure 2;

Figure 4 is a horizontal sectional view on the line IV—IV of Figure 3;

Figure 5 is a similar view on the line V—V of Figure 3;

Figure 6 is a similar view on the line VI—VI of Figure 3;

Figure 7 is a fragmentary view similar to a portion of Figure 3, but illustrating certain parts in different positions of adjustment; and, Figure 8 is a view similar to Figure 5, but illustrating a certain modification of the invention.

Figure 1:
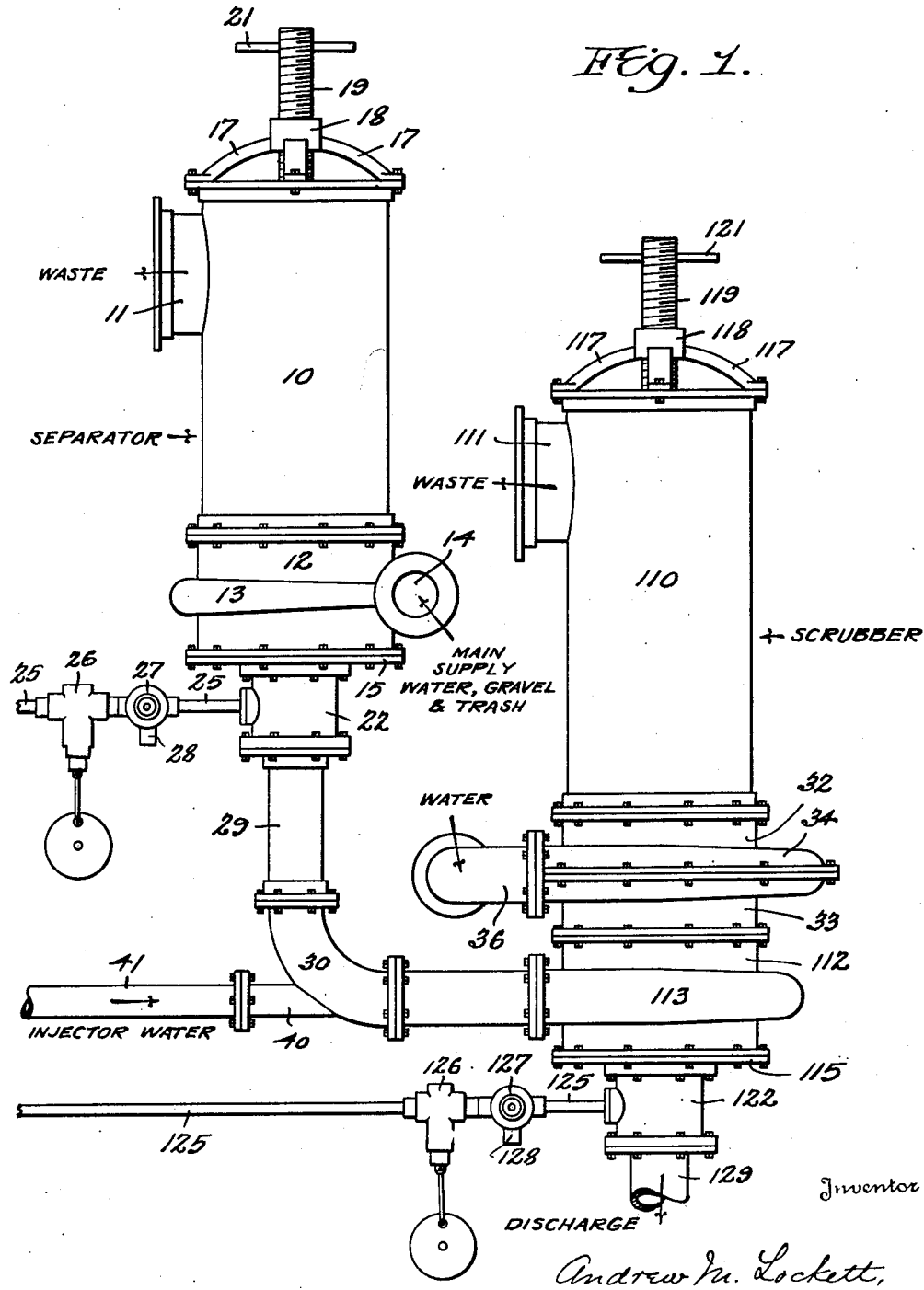

Broadly speaking, the invention comprises two structures, either of which may, under certain conditions, be utilized independently of the other but which are usually cooperatively positioned for operation together as a functional entity. The first of these structures, which I designate as a "separator", receives the stream of water and trash laden gravel from the discharge pipe of the hydraulic dredge. In this separator, all foreign substances of such specific gravity as to be maintained in suspension by the movement of the water whirling around the center and passing up through the outlet pipe are removed. Also, in this operation, an appreciable portion of the clay is dissolved and passes out in the shape of muddy water.

Other substances of such specific gravity as not to be eliminated in this way will fall to the bottom and pass out the lower opening. Among such substances will be particles of clay. Usually these substances are limited to the gravel itself and to the clay.

The gravel and the clay are then discharged from the separator, received by the second of the structures, which I designate as a "scrubber". In this scrubber, the clay and gravel, circulating around the center of the cylindrical vessel, the clay is subjected to a grinding action which reduces the balls of clay in size, and, in the majority of cases, completely dissolves them, so that they pass off in the shape of muddy water.

Thus, the commercially clean gravel is delivered by the scrubber for grading, storage, or for whatever use it may be desired.

Referring to the drawings, the separator is seen to consist, in general, of a vertically disposed cylindrical member 10, open at its upper and lower ends and provided, at a point adjacent its upper end, with a tangentially disposed discharge port 11.

While I have shown and prefer a tangentially disposed upper discharge port 11, which will function better than an opening not tangentially arranged, it is found that the apparatus will function quite well with any form or position of discharge opening which will permit the free outflow of the water, and, hence, do not limit myself to this particular and specific arrangement, as shown.

Removably secured to the lower end of the member 10 is another cylindrical member 12 in the wall of which is formed a volute 13 of progressively diminishing cross sectional area, and having, at its large outer end, a tangentially disposed inlet port 14.

The bottom of the member 12 is closed by means of a removably attached circular plate 15, which is provided with a centrally disposed discharge port 16, which is of materially less cross sectional area than is the discharge port 11.

Removably mounted upon the open upper end of the member 10 is a spider 17, which supports a central bearing 18 through which passes and is engaged the externally threaded upper end of a centrally disposed stem 19 to the lower end of which is secured a conical valve block 20 adapted to cooperate with the discharge port 16. The stem 19 may be readily rotated to effect raising or lowering with consequent adjustment of the valve block 20 by means of a transverse handle bar 21 passing through the stem at a point adjacent its upper end.

A further and important function of the stem 19 or 119 is effected for the reason that when the water is caused to circulate around the center or vertical axis of the hollow members 10, 12 and 110 by the tangential inflow of the stream, without this stem being of appreciable diameter the velocity of the water, as it reaches said center, or axis, might be lowered to the point where substances of fairly low specific gravity might not remain in suspension and gravitate to the bottom.

As will be seen, this stem forms a central core of appreciable diameter, preventing the circular velocity getting so low, as above explained, and serves to more positively and efficiently retain the foreign substances in suspension.

Furthermore, theoretically, at the dead center there would be no movement of the water, except upwardly, and it is quite possible that under certain conditions there might not be any upward movement at this point, which would defeat the successful operation and purpose of the invention.

Detachably mounted upon the lower face of the plate 15 and axially alined with the discharge port 16 is a supplementary flow controlling structure embodying a cylindrical casing 22 containing a rubber sleeve 23, which is clamped therein and which is of a normal internal diameter coincident with that of the discharge port 16. In the wall of the casing 22 is a port 24, through which water or other liquid may pass from a supply pipe 25 into the chamber occurring between the inner face of the casing 22 and the outer face of the rubber sleeve 23, or vice versa. Interposed in the line of the pipe 25 is a simple plunger pump 26, which may be either hand or power operated, and a three-way valve structure 27, the latter being provided with a drain port 28.

Leading from this supplementary flow controlling structure is a discharge pipe 29 which is connected by means of an elbow 30 to a pipe 31, which becomes the feed or supply for the scrubber structure. This scrubber, as will be seen, is very similar to the separator structure. So much so, in fact, that many of the parts are identical and interchangeable. The scrubber consists, primarily, of a cylindrical member 110, similar to the member 10, and having a tangentially disposed discharge port 111 similar to discharge port 11 shown in Figures 1 and 4. The lowermost part of the structure comprises a member 112 identical with the member 12 and having all corresponding parts. The reference numerals, denoting parts in the scrubber identical with parts already described in the separator, will be an even hundred greater than previously used, and no further explanation of such parts will be given, as it would involve merely unnecessary repetition.

One variation in structure to which attention must be called is the fact that the stem 119 is materially shorter than is the stem 19 and the discharge port 116 in the plate 115 is projected upwardly by means of a pipe 116ª mounted upon the upper face of the plate 115, so that the aperture of the port is but little below the discharge port 111.

Interposed between the member 110 and the member 112 is a supplementary member consisting of upper and lower detachable members 32 and 33, the pair cooperating to form a structure having formed in its wall a volute 34 of progressively diminishing cross sectional area and having at its large, outer end a supply port 35 connected, by means of an elbow 36, to a water supply pipe 37. Disposed within the volute 34 and in axial alinement with the walls of the members 32 and 33 is a ring 38 provided with a series of tangentially disposed supply ports 39, as is best shown in Figure 6.

The operation of the apparatus will be described. The mixture of water, gravel, trash and clay is delivered, by the discharge pipe of the hydraulic dredge, at a high velocity, to the inlet 14 of the volute 13 of the separator. The mixture is thus introduced into the separator, at a point adjacent its lower end and spins rapidly therein. The clay associated with the gravel has, during its passage through the pipes and pumps of the dredge, been formed into small compact balls, and, in the separator, these balls, together with the gravel, sink to the bottom. The lighter particles of trash, spinning about in the separator, rise to the surface and are carried away, with the overflowing water, through the discharge port 11. The clay and gravel fall through the discharge port 16. Adjustment of the valve block 20 insures the proper degrees of proportionate discharge through the two ports 11 and 16. Observation of conditions within the separator may, at all times, be had by looking down into the open upper end through the legs of the spider 17, and the handle bar 21 properly manipulated to insure best results.

Further control of the gravel discharge from the separator may be had by means of the structure including the rubber sleeve 23. To effect this, water is pumped through the supply pipe 25 by means of the pump 26 into the chamber between the casing 22 and rubber sleeve 23, the three-way valve 27 being properly adjusted to permit such pumping. As the water is pumped into the chamber, the sleeve 23 is distended, as shown in Figure 7, with consequent throttling of the passage way below the discharge port 16. When the desired adjustment has been attained, the three-way valve 27 may be closed to stop all flow through the pipe 25. To restore the sleeve 23 to its normal or non-distended position, the three-way valve 27 is adjusted to establish communication between the inner end of the pipe 25 and the exhaust port 28 and the water runs out.

As the gravel and clay pass through the elbow 30 on their way to the supply port 114 of the scrubber, their speed of flow is, preferably, augmented by a jet of water entering the elbow through a branch 40, which receives water under pressure from a supply pipe 41, with the result that the mixture entering the volute 113 of the scrubber has substantially the same high velocity as the original supply to the separator.

In the scrubber, owing to the provision of the central pipe 116ª, it is necessary that the lower and central portions of the structure become filled with gravel before any can escape to the discharge pipe 129. As this collected gravel and clay balls under extreme agitation, owing to the whirling imparted at the supply point and further maintained by the auxiliary water supplies, the clay balls, being subjected to a constant grinding action of the gravel, are worn down either to the point where they are completely dissolved or approximately to that point, and being slightly lighter than the gravel such remaining clay balls will pass out through the discharge port 111, and are quickly swept away by the waste water overflowing therethrough.

The function of the intermediate split section 32, 33 interposed between the members 110 and 112 is to provide for an additional agitation of and spin impartation to the gravel mass in the scrubber. Any tendency it might have to come to rest would be counteracted and overcome by the tangential inrush of water through the ports 39 in the ring 38. Should one of these intermediate "booster" sections prove insufficient for the best results, any desired number may be used, being superposed one upon another.

To recapitulate briefly, the apparatus described furnishes a structure wherein practically all foreign particles, except clay, are first removed from the gravel, and, in a subsequent step, the clay is removed and only the commercially clean gravel is discharged from the device. Suitable valve and throttling means have been provided at necessary points to properly control the flow of gravel through the apparatus and additional water supply is provided at desired points, and proper agitation of the gravel is, at all times, insured.

Thus, it will be seen that an apparatus has been provided wherein all of the recited objects of the invention have been attained, and one which is highly efficient for the purposes specified.

It is, of course, obvious that many changes and alterations may be made in the size, form and arrangement of the various parts without departure from the essential spirit of the invention. As, for example, the volute may be omitted from the supply member of either the separator or the scrubber, and a member, such as is shown in Figure 8, be substituted. In this form, the supply port 213 is merely tangential to the member 212. Other modifications will readily suggest themselves to those skilled in the art, and it is to be understood that all such modifications are contemplated as forming part of this invention, insofar as they fall within the scope of the appended claims.

What I claim is:

1. In a gravel cleaning apparatus, the combination of a separator comprising a vertically disposed cylindrical drum, a tangentially disposed supply port therefor arranged in a horizontal plane adjacent its lower end, a waste discharge port therefrom adjacent its upper end, a centrally disposed gravel discharge port communicating with the lower end of said drum, and a depending vertically adjustable centrally disposed enlarged valve stem within said drum and provided with a valve at its lower end adapted to be varied with respect to said horizontal plane and cooperating with said gravel discharge port communicating with the lower end of said drum and said tangentially disposed supply port to proportionate the flow through said gravel discharge port and supply port, a gravel scrubber in communication with said gravel discharge port, and means for feeding the gravel discharge from said separator into said scrubber.

2. In a gravel cleaning apparatus, the combination of a gravel separator having a gravel discharge port, a vertically disposed cylindrical scrubber member having a waste discharge port at its upper end, a tangentially disposed supply port in communication with the gravel discharge port of said gravel separator and arranged in a horizontal plane at its lower end, means for feeding the separated gravel into the supply port of said scrubbers, a closure for the lower end of said member provided with a lower scrubbed gravel discharge opening, a vertical discharge pipe axially arranged within said scrubber member and having its lower open end attached to and communicating with the gravel discharge opening in said closure and its upper open end in proximity to said waste discharge port, an internal depending and vertically adjustable centrally disposed stem having a valve block at its lower end adapted to be elevated or depressed with respect to the upper end and gravel discharge opening of said vertical discharge pipe to simultaneously regulate the flow through said supply port into the scrubber member and control the proportionate of flow through the upper waste discharge port and into the upper gravel discharge open end of and through said vertical discharge pipe and lower gravel discharge opening in said closure.

3. In a gravel cleaning apparatus, the combination of a gravel separator having a gravel discharge port, a scrubber, consisting of a vertically disposed cylindrical drum, a lower tangentially disposed gravel supply port therefor in communication with the gravel discharge port of said gravel separator and arranged in a horizontal plane and adjacent its lower end, means for feeding the separated gravel into the gravel supply port of said scrubbers, an upper waste discharge port adjacent its upper end, an intermediate tangentially disposed water supply port separate from and independent of said lower supply port and upper waste discharge port and arranged between the same for imparting rotative movement to the contents of said drum, a lower centrally disposed gravel discharge port at its lower end having a hollow vertical tubular extension surrounded by said lower supply and intermediate ports and its upper open end above said intermediate port and below the upper waste discharge port, and an internal and vertically adjustable centrally disposed stem depending from the top of said drum and provided at its lower end with a valve block adapted to be elevated or depressed with respect to the upper open end of said hollow vertical tubular extension of lower discharge port to simultaneously regulate or control the proportionate of flow through said upper and lower discharge ports and admission through said supply ports.

4. In a gravel cleaning apparatus, the combination of a gravel separator comprising a vertically disposed cylindrical member having upper and lower open ends, and having a waste discharge port adjacent its upper open end, a second vertically disposed cylindrical scrubber member communicating with the lower open end of said first named member and having a waste discharge port at its upper end, a tangentially disposed gravel supply port arranged in a horizontal plane at its lower end and in communication with the lower open end of said first named cylinder member, means for feeding the gravel from said separator into said gravel supply port of said scrubber, a closure for the lower end of said scrubber member provided with a lower gravel discharge opening, a vertical discharge pipe axially arranged within said scrubber member and having its lower open end attached to and communicating with the opening in said closure, and its upper open end in proximity to said waste discharge port of the scrubber member, an internal depending and vertically adjustable centrally disposed stem having a valve block at its lower end adapted to be elevated or depressed with respect to the upper end and opening of said vertical discharge pipe to simultaneously regulate the flow from the first named cylindrical member through the gravel supply port into the scrubber member and control the proportionate of flow through the upper waste discharge port and gravel through the discharge pipe and lower discharge opening in closure of lower end of said scrubber member.

5. The combination of a gravel separator and a scrubber disposed below said separator, said separator including a vertically disposed cylindrical drum, a tangentially disposed supply port arranged in a horizontal plane adjacent its lower end, a waste discharge port adjacent its upper end, a centrally disposed gravel discharge port communicating with the lower end of said drum, a depending vertically adjustable centrally disposed rod within said drum and provided with a valve at its lower end cooperating with said gravel discharge port communicating with the lower end of said drum to proportionate the flow through said upper waste discharge and centrally disposed gravel discharge port, said scrubber comprising a vertically disposed cylindrical drum, a tangentially disposed supply port therefor arranged in a horizontal plane adjacent its lower end and in communication with and receiving its supply of gravel from said centrally disposed gravel discharge port of said separator, a waste discharge port therefrom its upper end, a centrally disposed discharge port at its lower end, and a third tangentially disposed water supply port separate and independent of said first mentioned ports and arranged between the same for imparting a rotative movement to the contents of said scrubber drum, a hollow vertical tubular extension surrounded by said lower supply and intermediate ports and its upper open end above said intermediate water supply port and below the upper waste discharge port, and an internal and vertically adjustable centrally disposed valve stem depending from and within said drum and provided with a valve at its lower end cooperating with the upper open end of said hollow vertical tube extension to regulate and simultaneously control the proportionate of flow through said upper waste discharge and lower scrubbed gravel discharge ports and the flow of gravel through said lower supply port and water passing into the scrubber through said third tangentially disposed port.

ANDREW M. LOCKETT.